United States Patent

Johansson et al.

[11] Patent Number: 4,997,621
[45] Date of Patent: Mar. 5, 1991

[54] LOWER TIE PLATE WITH STEPPED HOLES TO CONTROL PRESSURE DROP AND FLOW DISTRIBUTION

[75] Inventors: Eric B. Johansson; Michael V. Curulla, both of San Jose; David W. Danielson, Aptos, all of Calif.

[73] Assignee: General Electric Company, San Jose, Calif.

[21] Appl. No.: 322,480

[22] Filed: Mar. 13, 1989

[51] Int. Cl.$^5$ .................................................. G21C 3/32
[52] U.S. Cl. ..................................... 376/444; 376/443; 376/445
[58] Field of Search ........................ 376/443, 444, 445

[56] References Cited

U.S. PATENT DOCUMENTS

| 4,775,510 | 10/1988 | Bryan | 376/443 |
| 4,828,791 | 5/1989 | DeMario | 376/352 |
| 4,889,684 | 12/1989 | Johansson | 376/444 |

Primary Examiner—Donald P. Walsh
Assistant Examiner—Meena Chelliah
Attorney, Agent, or Firm—Robert R. Schroeder

[57] ABSTRACT

An improved lower tie plate having increased fluid flow resistance is disclosed for use in a boiling water nuclear reactor. The fuel bundle includes the lower tie plate, an upper tie plate, and a plurality of fuel rods supported therebetween in vertical upstanding relation, with the fuel rods surrounded by a square sectioned channel. In the preferred embodiment, some of the upper fuel rods are of partial length. The surrounding channel confines the fluid flow through the fuel bundles between the tie plates for the extraction of heat from the fuel rods undergoing a fission reaction. The lower tie plate includes a first group of apertures for the support of the fuel rods to selected positions in the 9x9 matrix; appropriate numbers of these apertures are threaded for tying the upper and lower tie plates together with tie rods. The matrix is interrupted at larger apertures for the support of moderator containing water rods. The tie plate also includes a second matrix of through holes acting as fluid energy dissipation orifices. These fluid energy dissipation orifices include a first small downwardly exposed fluid receiving aperture which discharges to a second and larger upwardly exposed flow area preferably formed in the shape of a concentric aperture. In the preferred embodiment the inlet to the first concentric and small downwardly exposed fluid receiving aperture is rounded for the intake of fluid with maximum flow predictability. The outlet from the first concentric and small downwardly exposed fluid receiving aperture is abrupt to produce maximum predictable energy dissipating turbulence in the upwardly exposed fluid discharge area. Passage of fluid through the energy dissipation apertures causes an increased pressure drop at the lower tie plate, for the suppression of thermal-hydraulic flow instabilities, and coupled thermal-hydraulic nuclear instabilities. A serendipitous effect is present in that the increased pressure drop causes uniform fluid flow in the interior of the fuel bundle immediate the lower tie plate.

8 Claims, 5 Drawing Sheets

LOWER TIE PLATE WITH STEPPED HOLES TO CONTROL PRESSURE DROP AND FLOW DISTRIBUTION

This invention relates to nuclear fuel bundles and more particularly to an improved lower tie plate design for adding increased pressure drop to control fluid thermal-hydraulic and thermal-hydraulic-nuclear instabilities within a nuclear fuel bundle.

BACKGROUND OF THE INVENTION

Modern fuel bundles in boiling water nuclear reactors include increased numbers of side-by-side fuel rods. These increased numbers of side-by-side fuel rods are placed in arrays having many nuclear efficiencies. These nuclear efficiencies include the ability to design both the individual rods and the fuel bundle to overall higher power generation rates.

The history of increasing densities of the arrays of fuel rods in such fuel bundles can be best understood by setting forth the increasing number of matrix locations that have been used.

First, the reader will understand that not all possible locations within a fuel bundle matrix are used for the placement of fuel rods. Some of the matrix locations are otherwise occupied. For example, so-called water rods are utilized. These water rods are used for maintaining the requisite amount of moderating water throughout the fuel bundle during all power output and flow conditions for required reactor operation.

In alternate fuel locations so-called partial length rods are utilized. These partial length rods effect decreased pressure drop in the upper two phase region of the fuel bundle (the phases being water and steam). It will be understood that the partial length rods include many other advantages which it is not the purpose of this disclosure to cover.

The number of the matrix locations utilized has steadily increased with modern fuel bundle design. Originally in BWR/2 reactors a $7 \times 7$ matrix was utilized. Later an $8 \times 8$ matrix was adopted. In the preferred embodiment of this invention, a $9 \times 9$ matrix is utilized.

Under certain abnormal reactor operating conditions oscillations in coolant flow rate can occur. These flow rate oscillations are accompanied by oscillations in the amount of steam in the two phase steam water mixture. These oscillations are undesirable, and restrictions are placed on reactor operation to avoid them.

It is known theoretically that two expedients can reduce these instabilities.

One of these expedients is to reduce the pressure drop in the so-called two phase or upper region of the fuel bundle where both water and steam are present. So called "partial length rods" have been used in order to provide additional flow area in the upper region of the fuel bundle. These partial length rods permit the reduction of pressure drop in the two-phase region. Consequently the tendency for instabilities is reduced.

A second known expedient—and the expedient that is the subject matter of this patent application—is the increase of pressure drop at the lower tie plate.

SUMMARY OF THE PRIOR ART

Figure 1:
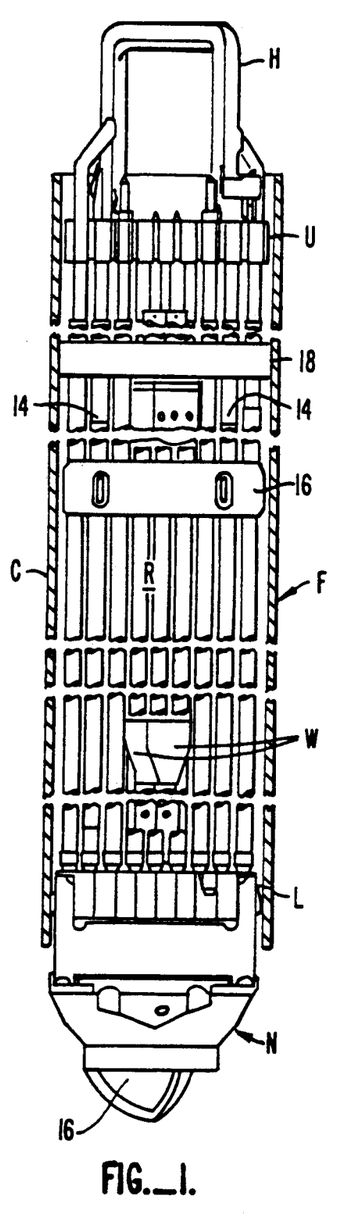
FIG. 1 is a longitudinal section of a fuel bundle and shows the location of the lower tie plate.

FIG. 1 shows a side elevation section of a fuel bundle. Flow enters the bottom of the fuel bundle through the nose piece, and moves upward to the tie plate. The tie plate forms the upper portion of the nose piece and supports the fuel rods and water rods. Flow passages are provided in the tie plate.

In the prior art, two types of tie plates have been utilized.

Figure 3A:
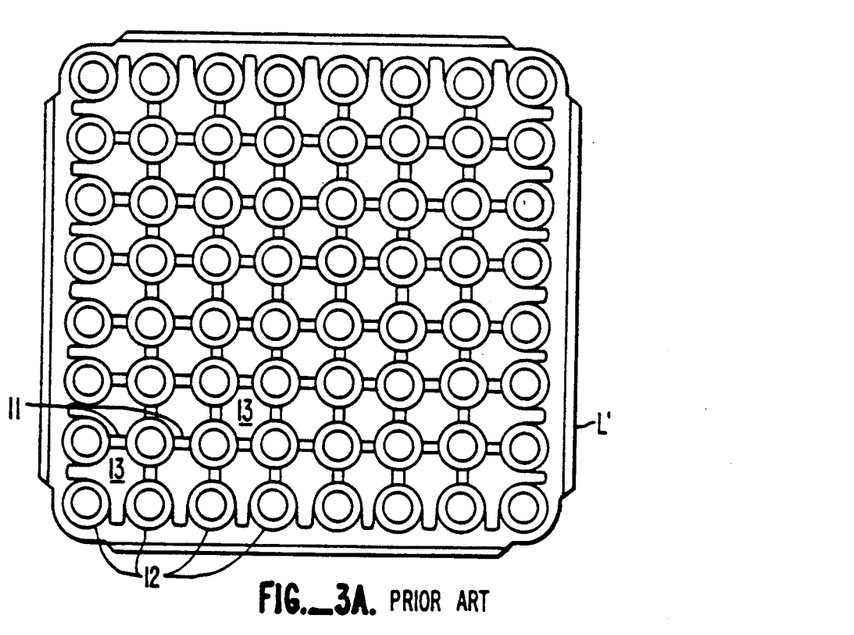
FIGS. 3A and 3B are plan view of the two different prior art lower tie plates.

Referring to FIG. 3A a first type of prior art lower tie plate can be understood. In this type of lower tie plate the fuel rods are supported by bosses and the bosses are connected by ribs. The rib thickness and boss diameter are close to the minimum required to support the fuel rods. The area for flow through the tie plate is large, resulting in a small pressure drop.

Figure 3B:
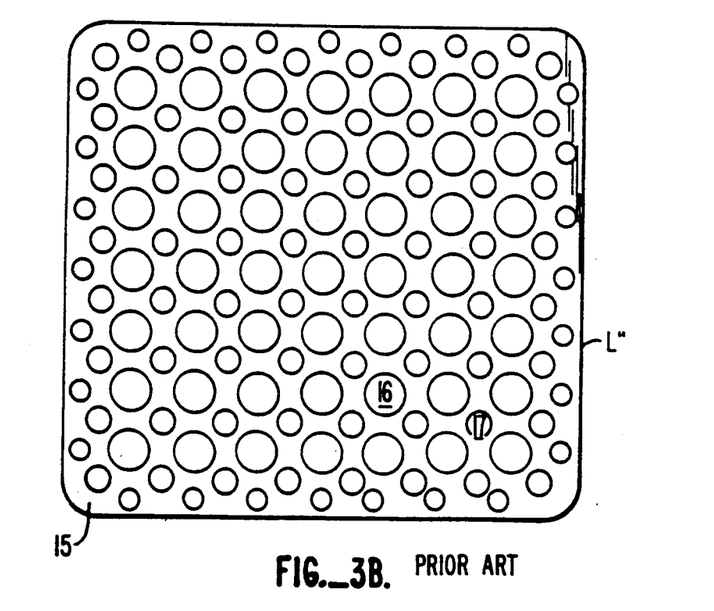

Referring to FIG. 3B, a second type of prior art lower tie plate is shown. A first matrix of holes provides locations for support of fuel rods. A second matrix of holes provides area for flow through the lower tie plate. Typically, the flow holes have been large in order to provide a low resistance flow path.

In the prior art, flow instability was not a concern and there was no need for high pressure drop through the lower tie plate.

In some advanced fuel bundle designs, provisions must be made to prevent flow instabilities. As previously discussed, one measure for suppressing instabilities is to incorporate greater pressure drop in the lower tie plate.

An obvious way to increase the pressure drop is to modify the prior art lower tie plate with round flow holes of FIG. 3B, by reducing the flow hole diameters. However, this results in very high velocity jets exiting the flow holes. These jets are likely to cause flow induced vibration of the fuel rods. The invention disclosed here provides the required pressure drop, but does not produce high velocity jets.

SUMMARY OF INVENTION

An improved lower tie plate having increased fluid flow resistance is disclosed for use in a fuel bundle having preferably a relatively dense array of fuel rods spaced to a $9 \times 9$ matrix. The fuel bundle includes the lower tie plate, an upper tie plate, and a plurality of fuel rods supported therebetween in vertical upstanding relation, with the fuel rods surrounded by a square sectioned channel. In the preferred embodiment, some of the upper fuel rods are of partial length. The surrounding channel confines the fluid flow through the fuel bundles between the tie plates for the extraction of heat from the fuel rods undergoing a fission reaction. The lower tie plate includes a first group of apertures for the support of the fuel rods to selected positions in the $9 \times 9$ matrix; appropriate numbers of these apertures are threaded to receive threaded tie rods which connect the upper and lower tie plates; the matrix is interrupted at larger apertures for the support of moderator containing water rods. The tie plate also includes a second matrix of through holes acting as fluid energy dissipation orifices. These fluid energy dissipation orifices include a first and small downwardly exposed fluid receiving aperture and discharge to a second and larger upwardly exposed flow area. Preferably the upper and lower apertures are circular and concentric. In the preferred embodiment the inlet to the first concentric and small downwardly exposed fluid receiving aperture is relieved for the intake of fluid with maximum flow predictability. The outlet from the first small and downwardly exposed fluid receiving aperture is abrupt to produce maximum predictable energy dissipating turbulence in the upwardly exposed fluid discharge area.

The energy dissipation in the flow apertures causes an increased pressure drop through the lower tie plate. As the flow passes from the first small and downwardly exposed aperture to and toward the larger upwardly exposed aperture, the flow expands to fill the larger aperture. In expanding, the flow velocity decreases so that high velocity jets exiting from the top of the tie plate are avoided.

Other Objects, Features and Advantages

An object to this invention is to disclose a construction of the lower tie plate that allows for the dissipation of coolant flow energy. According to a preferred embodiment of this invention, the lower tie plate is provided with a first matrix of fuel rod supporting apertures. These apertures support the fuel rods in the preferred embodiment in a 9×9 array.

A second matrix of fluid energy dissipating apertures is disposed in the tie plate. This matrix of apertures is interstitial to and between the position of fuel rod support apertures.

Each aperture extends through the tie plate to allow the inflow of water coolant. In the preferred embodiment, the energy dissipation aperture includes a small aperture in the lower portion of the lower tie plate. The region where this aperture meets the lower surface of the tie plate is rounded to provide a smooth transition from the large flow area below the lower tie plate to the small area of the apertures. A smooth transition gives a predictable pressure loss for flow entering the lower aperture. A sharp edge at the bottom of the aperture would give a pressure loss which is very sensitive to the exact shape of the edge.

Concentric to and overlying this small aperture is a larger energy dissipation aperture. Preferably the juncture between the two apertures is provided with an abrupt right angle edge. In water flow from the small orifice to the large orifice, the abrupt edge generates turbulence. This turbulence is distributed in the larger aperture and thereafter in the fluid flow above the tie plate. There results an increased pressure drop across the lower tie plate.

An advantage of this invention is that increased pressure drops in the range of 6/10ths of a pound per square inch can be generated at the lower tie plate.

A further advantage of this invention is that the pressure loss occurs within and just above the tie plate. The flow through the apertures expands to the diameter of the upper portion of apertures so that the flow velocity above the tie plate is not excessive. High flow velocity could cause vibration of the fuel rods.

A further advantage of this invention is that the rounded entrance to the apertures gives a highly predictable pressure drop. In addition, the pressure drop is not sensitive to the degree of rounding. Then tight manufacturing tolerances are not required and manufacturing costs are reduced.

Yet a further advantage of this invention is that the increased pressure drop through the lower tie plate causes a more uniform distribution of flow over the fuel bundle cross section.

A further object of this invention is to set forth a number of specific designs of similar import for the disclosed energy dissipating orifice and the support of the fuel rods.

BRIEF DESCRIPTION OF THE DRAWINGS

Other objects, features and advantages of this invention will become more apparent after referring to the following specification and attached drawings in which;

FIGS. 5A, 5B, 5C, 5D, and 5E show the preferred embodiment and variations on the preferred embodiment in detail;

FIGS. 5D and 5E show variations on the preferred embodiment;

FIGS. 6A, 6B, and 6C show an alternate embodiment of this invention;

Referring to FIG. 1, a fuel bundle F is illustrated in section. The fuel bundle includes a nose piece N for resting support on a coolant inlet orifice known as a "elephant's foot" (not shown). The bundle includes a lower tie plate L, an upper tie plate U and a plurality of fuel rods R extending therebetween. The matrix of fuel rods is surrounded by a channel C, which channel C is square in section. Certain of the fuel rods 14 are partial length extending over the lower 5/7ths of the fuel bundle. Two large and central water rods W are utilized to provide sufficient moderator throughout the length of the fuel assembly. As is conventional, a handle H is provided for the raising and lowering of the fuel bundle F as an entity.

Operation can be oversimplified. Coolant enters the aperture 16 in the lower nose piece N. It thereafter passes through lower tie plate L and between the fuel rods R. In such passing, the coolant accomplishes two functions.

First, it acts as a moderator to fast neutrons produced in the fission reaction. These fast neutrons are moderated to thermal neutrons by passage through coolant and produce the critical fission reaction.

Second, some of the moderator is turned to steam. This steam is generated in the upper and two phase region of the reactor. In the actual fuel bundles (in the order of 12 feet long) the two phase region extends in the upper two thirds to three quarters of the fuel bundle.

The reader will understand that it is the upper, two phase region in which the previously referred "instabilities" can primarily occur. It is the purpose of this invention to increase pressure drop at the lower tie plate and therefore decrease the instabilities in the upper two phase region of the reactor.

Certain of the fuel rods R are partial length rods as shown at 14. These partial length rods terminate typically above a spacer 16 (see FIG. 2B). Above these partial length rods, the spacers have special construction. (See FIG. 2C.)

Figure 2A:
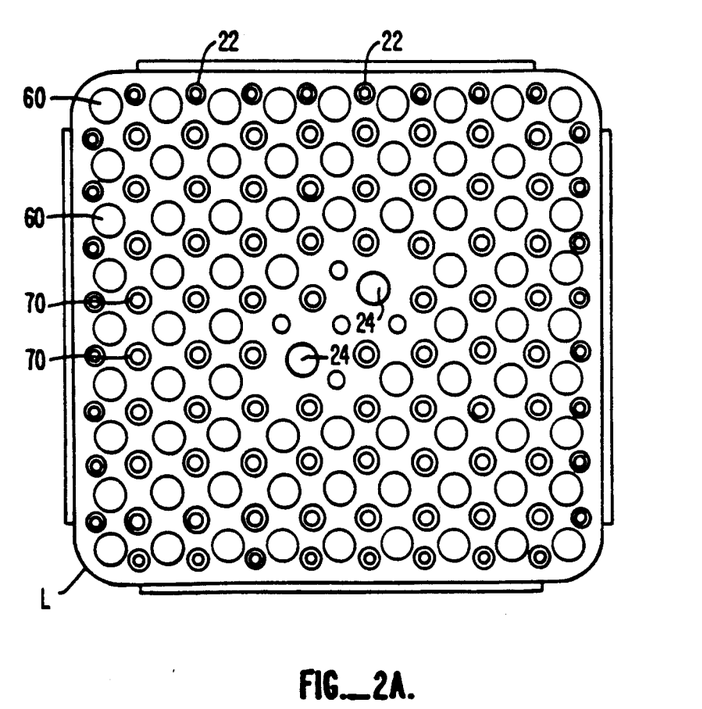
FIGS. 2A, 2B, 2C and 2D are respective sections of the lower tie plate, five lower spacers, two upper spacers, and an upper tie plate in the fuel bundle of FIG. 1, the view of FIG. 2A being enlarged for a clear understanding of a lower tie plate construction.

Referring to FIG. 2A, the improved lower tie plate of this invention is illustrated. It includes a first group of fuel rod support apertures 60. As the reader can see, apertures 60 are placed in a 9×9 matrix.

Interstitially of the apertures 60 are energy dissipation orifices 70. As the reader can likewise see, orifices 70 are placed in an 8×8 matrix.

Additional energy dissipation orifices 22 are placed near the edges of the lower tie plate. These orifices are smaller than the interior orifices 70 because of the limited space between the outer rows of fuel rod apertures 60 and the outer edges of the lower tie plate.

It will be understood by the reader that both matrices are interrupted. Specifically, they are interrupted at two central locations 24. These central locations are for the purpose of supporting the so-called large water rod.

Figure 2B:
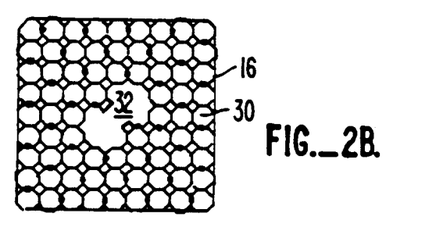

Referring to FIG. 2B, a typical spacer construction 16 is illustrated for the five of the total of seven spacers. Typically all of seven spacers are distributed at equal intervals along the length of the 14 foot long fuel bundle.

The five lower spacers define a 9×9 matrix of apertures 30. This matrix of apertures is interrupted in the center section by an enlarged aperture 32 for placement of the water rods.

As has been illustrated with respect to FIG. 1, partial length rods 14 terminate immediately above the fifth spacer. Consequently there is no need in the remaining two spacers to preserve the 9×9 matrix shown in FIG. 2B. With respect to FIG. 2C, it can be seen that the 9×9 matrix 30 includes additional vacancies. These additional vacancies are above each of the partial length rods 14 and are denominated by the numeral 36.

Figure 2C:
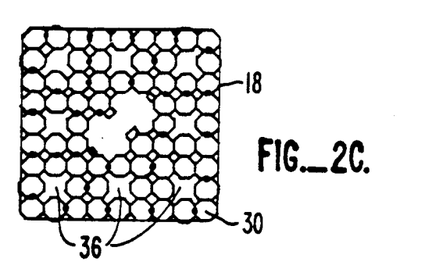
Figure 2D:
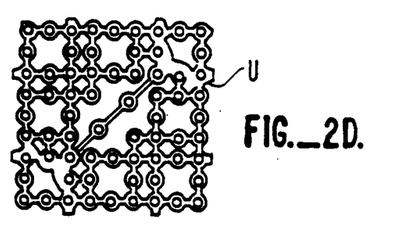

Finally, and referring to FIG. 2D, the upper tie plate is illustrated. The upper tie plate, unlike the lower tie plate, is designed for maximum flow area and minimum flow resistance. The upper tie plate contains bosses for supporting the full length lengths; these bosses are connected with the minimum amount of material required for strength of the upper tie plate. The upper tie plate of FIG. 2D, together with the two upper spacers of FIG. 2C, provide a low resistance flow path in the upper part of the fuel bundle for flow of the two phase steam-water mixture.

Utilizing the view of the fuel bundle illustrated in FIG. 1, and referring first to FIG. 3A and second to FIG. 3B, the operation of the prior art lower tie plate can be understood.

Referring to FIG. 3A, the type of lower tie plate L' is illustrated wherein the lower tie plate contains a small amount of material. Simply described, the tie plate defines a first matrix of fuel rod support locations 12. The fuel rod support locations are connected by grid members 11. The combination of the fuel rod support locations and grid defines a matrix of coolant flow passages 13. These passages provide a low pressure drop flow path from the nose piece N to the interior of the fuel bundle.

Referring to FIG. 3B a second prior art lower tie plate L" is shown. It includes a plate 15 defining two matrices. A first matrix of fuel rod support locations 16 is defined. A second matrix of flow apertures 17 is interstitially placed between the fuel rod support locations 16.

This second prior art lower tie plate shown in FIG. 3B has somewhat less flow area than the first prior art lower tie plate of FIG. 3A. However, the pressure drop through this tie plate is also small.

The flow effects of these prior art lower tie plates have previously been discussed. They may be briefly restated.

First, there is a very small pressure drop through the lower tie plate.

Second, the flow through the lower tie plate is not entirely uniform. There is more flow through the central portion of the lower tie plate, which is directly above the nose piece.

Figure 4:
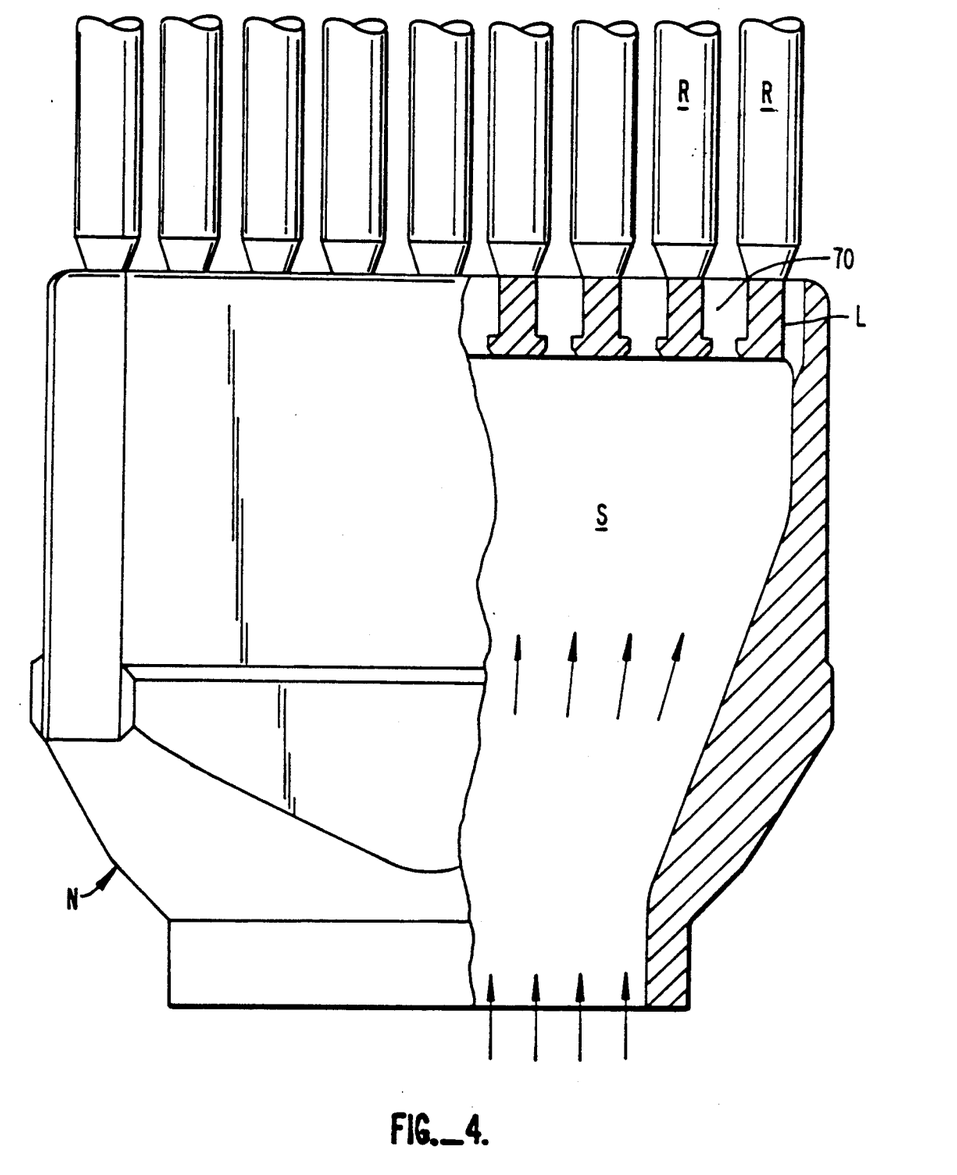
FIG. 4 is an elevation view of the lower tie plate with the preferred embodiment of this invention.

Referring to the preferred embodiment of FIGS. 2A and 4, flow enters at the bottom of the nose piece and moves upward. The flow tends to remain in the central cross section S defined by the nose piece entry.

The lower tie plate pressure drop could be increased by simply decreasing the size of the flow holes in the prior art lower tie plate of FIG. 3B. However, this would result in high velocity jets exiting from the tie plate. These jets could cause flow induced vibration of fuel rods.

Figure 5A:
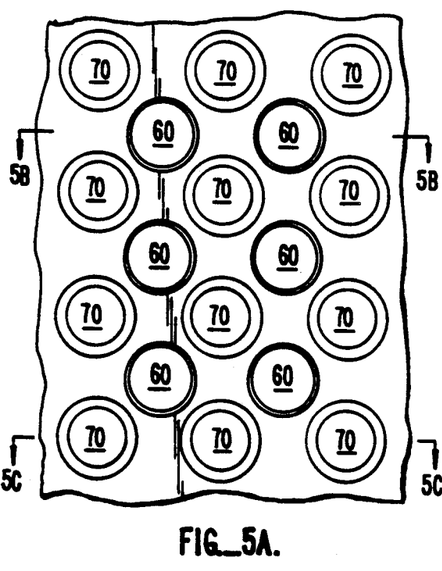
FIG. 5A is a plan view of a portion of the lower tie plate.

The invention disclosed here avoids the high velocity jets by using two step flow holes. The preferred embodiment is shown on FIGS. 2A, 5A, 5B, and 5C. FIG. 5A shows a plan view of a portion of the tie plate. The tie plate contains a first matrix of apertures. Apertures 60 are typically unthreaded and support at the bottom the individual fuel rods R.

Figure 5B:
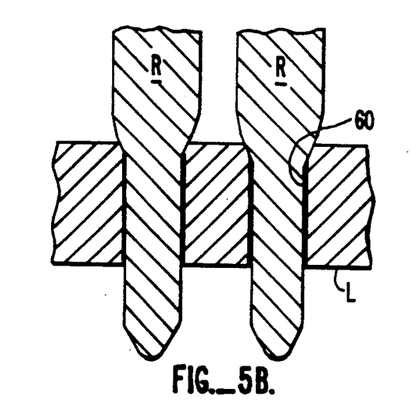
FIG. 5B is a cross section through the centers of the holes which receive the fuel rods.

Referring to FIG. 5B, a cross section through the centers of two fuel rods R and apertures 60 is shown. This illustrates the support of the fuel rods in the lower tie plate.

As is standard in the art, fuel rods consist of tubular cladding filled with fissionable material, with solid end plugs at the top and bottom of the fuel rods. The lower end plugs are shown in FIG. 5B. Some of the fuel rods have threaded end plugs (not shown) which fit into threaded apertures (not shown). These fuel rods tie the upper and lower tie plates together.

A second matrix of apertures 70 is present. These apertures 70 constitute fluid energy dissipation apertures. Their construction and function can best be seen with respect to FIG. 5C.

Figure 5C:
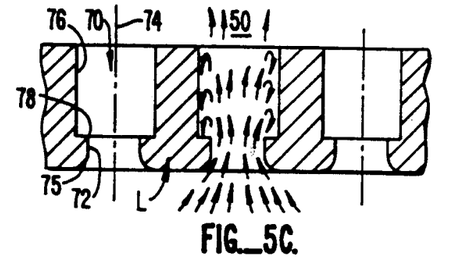
FIG. 5C is a cross section through the centers of the apertures for coolant flow showing the preferred embodiment, and showing the flow path through the apertures.

Referring to FIG. 5C a fluid dissipation aperture 70 includes a lower concentric aperture 72. Aperture 72 is typically concentric to an axis 74 of the aperture through the lower tie plate L. Aperture 72 has two characteristics that are important.

First, the aperture is relieved at the lower portion at a relief 75. As is illustrated with respect to the flow arrows in water 50, the relief at 75 permits predictable entry of the coolant 50 into the lower concentric aperture 72.

An upper concentric aperture 76 is formed. Upper concentric aperture 76 is larger than lower concentric aperture 72. The ratio of the upper diameter to the lower diameter can vary from 1.1 to 2.0.

It is important to note the abrupt edge 78 between the lower aperture 72 and the upper aperture 76. This abrupt edge 78 generates a maximum and predictable turbulence in the water flow 50. This turbulence with its associated energy dissipation causes an increased pressure drop through the tie plate.

The increased pressure drop through the tie plate causes a more uniform distribution of flow. Referring to FIG. 4 the jet coming from the nose piece encounters a high resistance at the tie plate, which causes the jet to spread to the outer edges of the tie plate. It has been found by experimentation that the high pressure drop lower tie plate disclosed here causes nearly uniform flow across the entire bottom of the fuel bundle. Thus, it will be understood that in addition to providing a greater pressure drop on the passage of the coolant 50 through the lower tie plate L, the disclosed invention utilizes the energy of the pressure drop to produce a more uniform and even fluid flow immediately adjacent the lower tie plate.

Figure 5D:
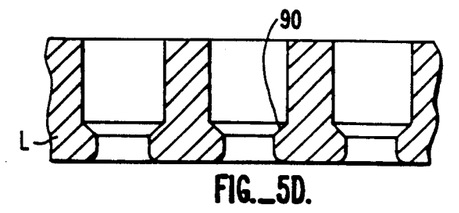
Figure 5E:
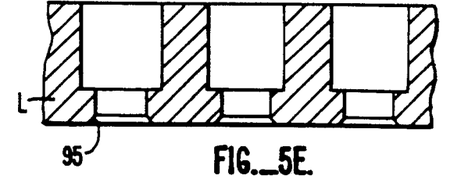

Referring to FIGS. 5D and 5E alternate embodiments are shown. In FIG. 5D the transition from the lower small aperture to the large upper aperture is less abrupt. The transition has conical section 90 instead of the step in the preferred embodiment. For a given ratio of upper to lower aperture diameters, the pressure drop will be slightly less.

Referring to FIG. 5E the entrance to the lower aperture has a small chamfer 95 instead of a large radius. The small chamfer will cause a greater pressure drop. However, the increase in pressure drop is highly sensitive to the amount of chamfer. Therefore, it is more difficult to obtain a controlled pressure drop than in the preferred embodiment.

An additional embodiment (not shown) could combine the less abrupt transition 90 of FIG. 5D and the small chamfer 95 of FIG. 5E.

. The reader will likewise understand that what is required for the operation of this invention is a lower aperture and a volume above the aperture which allows sufficient dissipation of the inlet fluid energy in turbulence so that by the time the fuel rods are reached, a uniformly distributed turbulent flow is present. The embodiment of FIGS. 6A–6C is illustrative of such a construction.

Figure 6A:
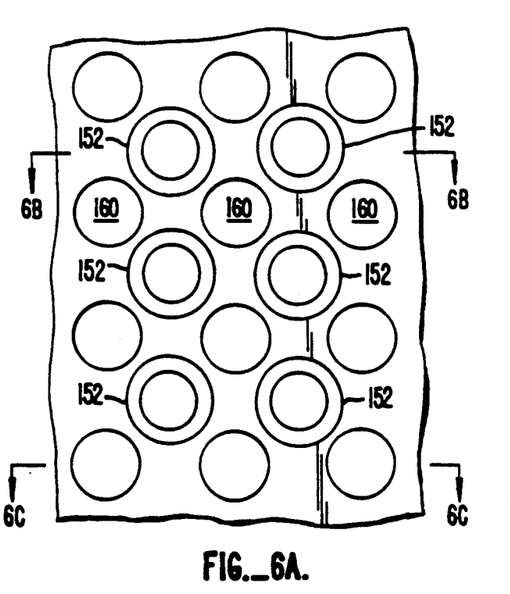
FIG. 6A is a plan view of a portion of the lower tie plate.
Figure 6B:
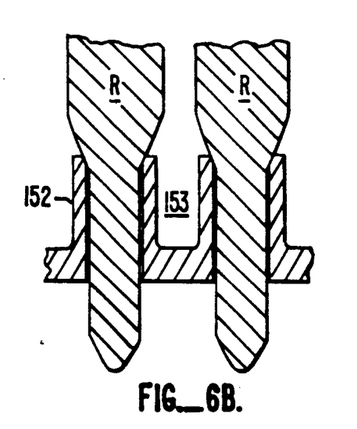
FIG. 6B is a cross section through the centers of bosses which support the fuel rods.

Referring to FIGS. 6A and 6B the individual fuel rods R are supported on raised ferrules 152. Raised ferrules 152 are cylindrical upward protrusions cast in a matrix so as to protrude upwardly and above the preferred 9×9 matrix illustrated in FIG. 2A. As can be seen the ferrules define a volume 153 therebetween. This volume between the ferrules at 153 is utilized for the generation of the required turbulence.

Figure 6C:
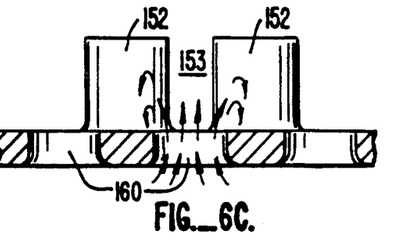
FIG. 6C is a cross section through the centers of the apertures for coolant flow, showing the flow path.

Referring to FIGS. 6A and 6C the fluid inlet apertures 160 are illustrated. Coolant passes through apertures 160 and into the volume 153 between the ferrules 152. It is in volume 153 that the turbulent flow occurs. Again, turbulence with appropriate energy dissipation follows. The turbulence is uniformly present across the breath of the tie plates at the time the upflowing coolant 50 reaches the lower portions of the rods R.

The reader will understand that the disclosed invention has been illustrated in the preferred embodiment including partial length fuel rods and a 9×9 regular matrix of fuel rods. It will be understood that the disclosed lower tie plate is just as applicable to other regular and irregular matrices. For example, the matrix could as well be 8×8 or 10×10. Further, the matrix of both the fuel rod support locations and/or the noninterferring matrix of flow locations could be irregular. In short, the use of the term matrix includes the various patterns, regular and irregular that can be used for the spaced apart support of fuel rods and flow apertures through a lower tie plate.

As can be seen the disclosed invention will admit of a number of modifications.

We claim:

1. In a fuel bundle for a boiling water nuclear reactor, the fuel bundle including a lower tie plate for the support of fuel rods in side-by-side upstanding relation and permitting the inflow of moderating coolant for the moderation of fast neutrons to thermal neutrons for the maintenance of a critical nuclear reaction and the generation of steam from said coolant, an upper tie plate for the upper support of fuel rods in said side-by-side upstanding relation and permitting the outflow of moderating coolant and generated steam; a plurality of fuel rods arrayed in a matrix supported on said lower tie plate and extending towards and to said upper tie plate, said fuel rods containing fissionable material for supporting a critical nuclear reaction; a channel surrounding said tie plates and said fuel rods for confining fluid flow between said upper and lower tie plates to cause heating of said moderator with boiling in the upper portion of said fuel bundle, the improvement to said lower tie plate including:

a first matrix of locations configured for the support of said fuel rods in upstanding relation;

a second matrix of fluid flow apertures for through flow of moderating coolant from below said fuel rod supporting lower tie plate to said fuel rods supported above said lower tie plate, said second matrix being interstitial of said first matrix for the distribution of coolant between said supported fuel rods; and, a fluid energy dissipation volume defined immediately above each said fluid flow aperture and below the bottom of said supported fuel rods for the generation of turbulent flow above said fluid flow apertures whereby increased pressure drop is induced through said lower tie plate and turbulent fluid flow is induced across said fuel bundle immediate said lower tie plate at said fuel rods.

2. The invention of claim 1 and wherein said flow apertures each comprise a first and lower concentric aperture for admitting coolant through said lower tie plate and a second and larger aperture concentric to said first aperture for providing a volume for permitting the generation of said turbulence.

3. The invention of claim 2 and wherein said lower portion of said first concentric aperture is relieved to provide a smooth entry for coolant flow; said smooth entry giving a predictable pressure drop which is not sensitive to manufacturing tolerances.

4. The invention of claim 2 and wherein the junction between said lower concentric aperture and said upper concentric aperture constitutes a right angle for the generation of maximum predictable turbulence.

5. An improved fuel bundle for a boiling water reactor, said bundle comprising the lower tie plate for the support of fuel rod in side-by-side upstanding relation, said lower tie plate having apertures permitting the inflow of moderating coolant from the bottom of said fuel bundle for the moderation of fast neutrons to thermal neutrons for the maintenance of a critical nuclear reaction in the generation of steam from said coolant;

a first matrix of locations configured from said lower tie plate for the support of said fuel rods and upstanding relation;

a second matrix of fluid flow apertures for through flow of moderating coolant from below said fuel rod supporting lower tie plate to said fuel rod support above said lower tie plate, said second matrix being interstitial of said first matrix for the distribution of coolant between said supported fuel rods;

said lower tie plate further defining a fluid energy dissipation volume defined immediately above each said fuel flow aperture and below the bottom of said support fuel rods for the generation of turbulent flow above said fluid flow aperture whereby increased pressure drop is induced through said lower tie plate and turbulent fluid flow is induced across said fuel bundle immediate said lower tie plate;

an upper tie plate for the upper support of fuel rods in said side-by-side upstanding relation in permitting the outflow of moderating coolant and generating steam;

a plurality of fuel rods arrayed in a matrix supported on said lower tie plate and extending towards and to said upper tie plate, said fuel rods containing fissionable material for supporting a critical nuclear reaction; and, a channel surrounding said tie plates and fuel rods for confining fluid flow between said upper and lower tie plates to cause heating of said moderator with boiling in the upper portion of said fuel bundle.

6. The invention of claim 5 and wherein said flow apertures each comprise a first and lower concentric aperture for admitting coolant through the lower tie plates and a second and larger aperture concentric to said first aperture, said second aperture providing a volume for the generation of turbulent fluid flow.

7. The invention of claim 5 and wherein said lower portion of said first concentric aperture is relieved to provide a smooth entry coolant flow.

8. The invention of claim 5 and wherein the junction between said lower concentric aperture and said upper concentric aperture constitutes a right angle for the generation of maximum predictable turbulence.

* * * * *